United States Patent [19]
Chiaretti et al.

[11] Patent Number: 5,675,681
[45] Date of Patent: Oct. 7, 1997

[54] INTERCONNECTION ELEMENT FOR MULTIFIBER CABLES

[75] Inventors: Guido Chiaretti, Novate Milanese; Giacomo Parafioriti, Cinisello Balsamo, both of Italy

[73] Assignee: Italtel SPA, Milan, Italy

[21] Appl. No.: 716,458

[22] PCT Filed: Mar. 29, 1995

[86] PCT No.: PCT/EP95/01128
§ 371 Date: Nov. 14, 1996
§ 102(e) Date: Nov. 14, 1996

[87] PCT Pub. No.: WO95/26515
PCT Pub. Date: Oct. 5, 1995

[30] Foreign Application Priority Data

Mar. 29, 1994 [IT] Italy .................................. MI94A0594

[51] Int. Cl.⁶ ........................................ G02B 6/38
[52] U.S. Cl. .................... 385/59; 385/54; 385/80; 385/65
[58] Field of Search .................... 385/54, 59, 63, 385/65, 83, 80

[56] References Cited

U.S. PATENT DOCUMENTS 4,898,449  2/1990  Vroomen et al. ................ 350/96.21
4,993,800  2/1991  Shibata ............................. 385/54
5,600,747  2/1997  Yamakawa et al. ............... 385/59

FOREIGN PATENT DOCUMENTS 008987    3/1980   European Pat. Off. .
61-061111 3/1986   European Pat. Off. .
0514722   11/1992  European Pat. Off. .
0543094   5/1993   European Pat. Off. .

OTHER PUBLICATIONS

Jacobs et al. (1988) *Optical Communication (ECOC 88)*, Part 1, pp. 585–588.

*Primary Examiner*—John Ngo

[57] ABSTRACT

Multifiber interconnection element for optic fiber cable including two cylindrical complementary elements with optic fibers belonging to multifiber cables to be connected, abutted to the same. Each one of the complementary elements shows outside a longitudinal notch at least, having shape and size similar to the shape and size of a corresponding longitudinal slide obtained on the internal surface of a coupling bush. These complementary elements are inserted for reciprocal coupling inside this bush with the relevant front contact parts turned one against the other.

15 Claims, 3 Drawing Sheets

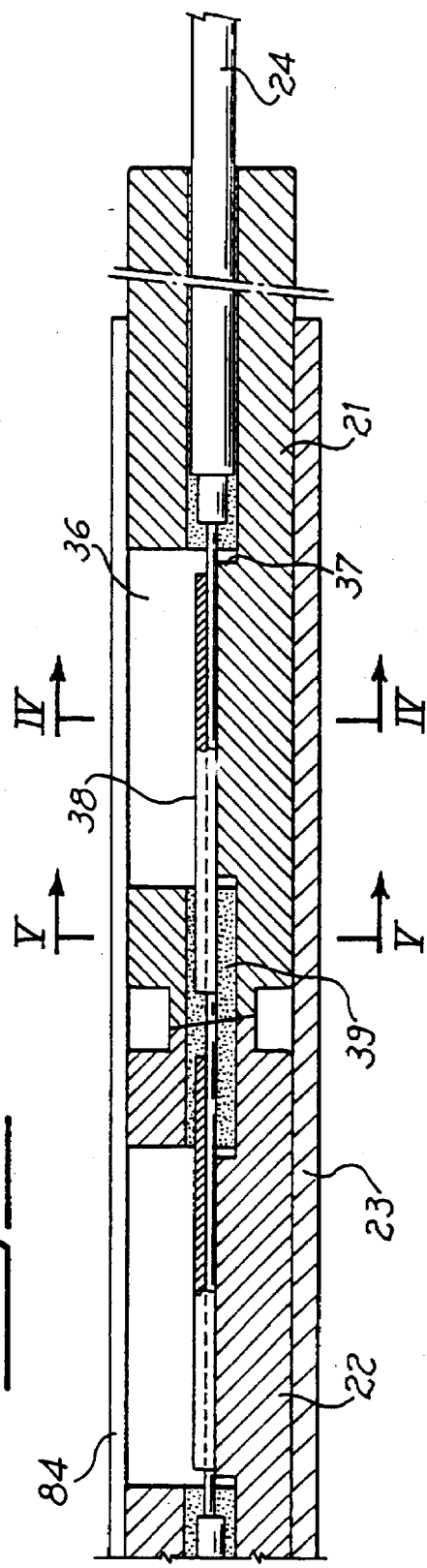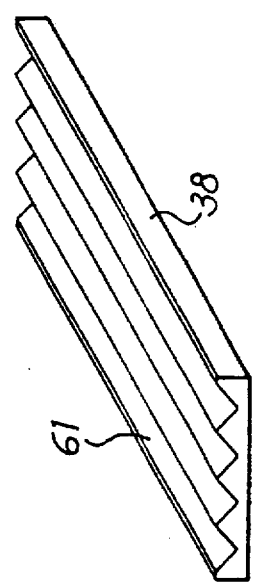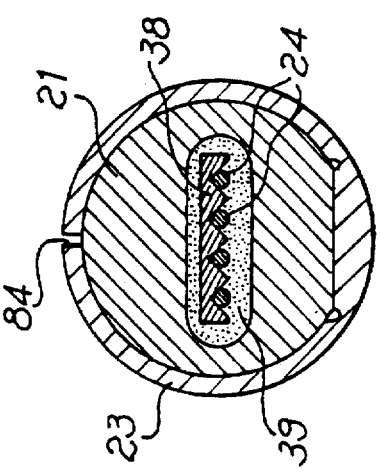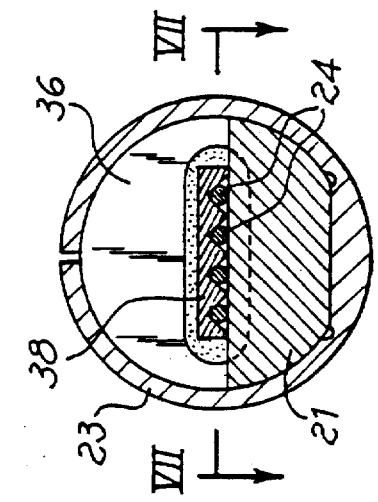

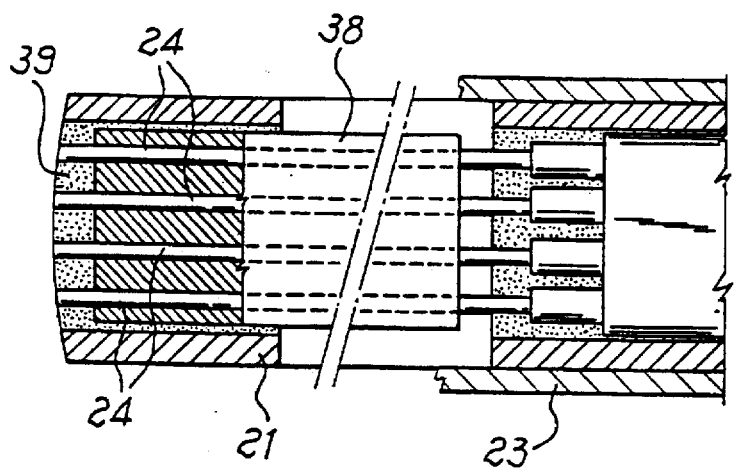
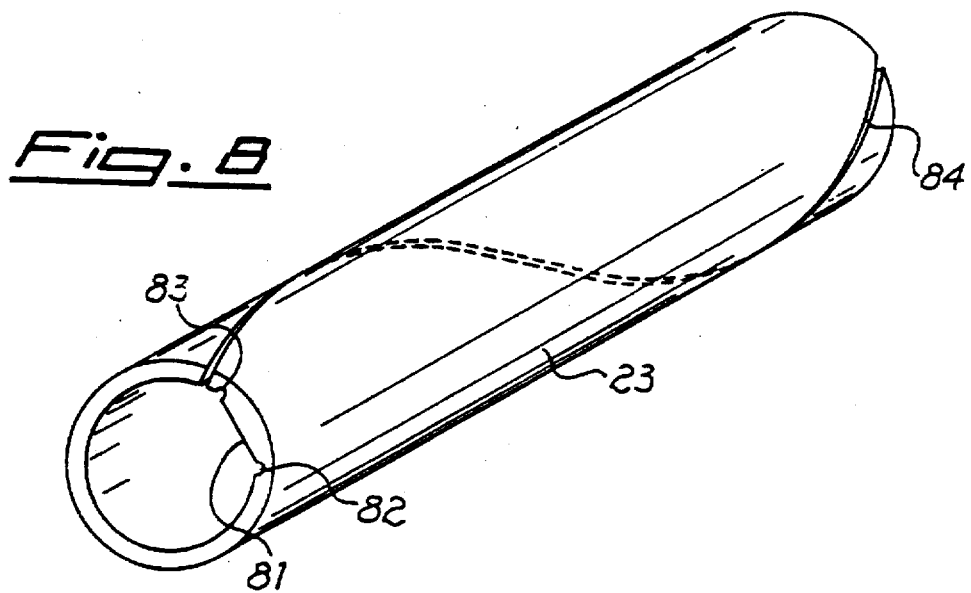
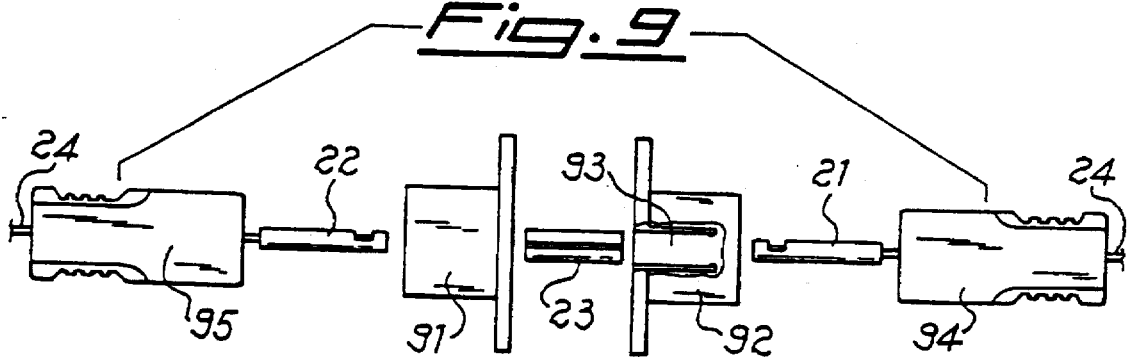

INTERCONNECTION ELEMENT FOR MULTIFIBER CABLES

FIELD OF THE INVENTION

The present invention generally relates to optic fiber signal transmission equipment.

More in particular, this invention concerns a multifiber connector device for optic fiber cables.

Different types of connectors are known and used for the realization of connections among optic fiber cables.

BACKGROUND ART

A first example of a typical multifiber connector, indicated as a whole with 10, is shown in FIG. 1.

Connector 10 includes two coupling parts indicated with 13 and 13', respectively.

Inside part 13 of connector 10, a plurality of optic fibers 12 is housed and comes out from the end of an optic fiber tape 11.

Similarly, inside part 13' of connector 10, a plurality-of optic fibers is housed and comes out from the end of an optic fiber tape 11'.

On the front surface 15 of part 13 of connector 10, two guide holes 14 are obtained.

Holes 14 are placed aside fibers 12 with longitudinal axis parallel to the axis of the fibers themselves.

The front surface 15' of part 13' shows two pins 16.

Pins 16 are arranged aside the optic fibers 12' with longitudinal axis parallel to the axis of the fibers 12' and in a position coinciding to holes 14.

Connector 10 includes a clamping spring 17 to fix the two parts 13 and 13'.

Through insertion of the two pins 16 inside the guide holes 14 optic fibers 12 alignment with optic fibers 12' is obtained and, consequently, the optic connection of cable 11 and cable 11 '.

Due to the action of the clamp 17, the two front surfaces 15 and 15' of the two parts 13 and 13' reciprocally adhere.

A serious problem associated to similar connectors is due to the fact that they do not allow satisfactory alignment of optic fibers abutted on the two parts 13 and 13' of Connector 10.

In connector 10 of FIG. 1 the correct alignment of fiber is simply determined by the coupling between pins 16 and holes 14.

This mechanical coupling is absolutely insufficient to align optic fibers with the required very high accuracy.

To this purpose, it must be considered that the active core thickness of an ordinary optic fiber is of 8 micron only.

Being the transmission coefficient between two coupled fibers proportional to the area of the contact front surface of fibers themselves (hence, inversely proportional to the square of distance between axis of fibers) we can easily understand how a minimum misalignment among fibers (in the range of micron fractions) can lead to unacceptable attenuation of the signal.

To try to minimize this serious disadvantage, pins 16 and holes 14 are made according to very high accuracy construction techniques, involving an increase of realization costs and difficult construction processes.

Also, to allow the insertion of pins 16 inside guide holes 14, the external diameter of pins 16 must be slightly lower than the internal section of guide holes 14.

The backlash associated to this small size difference is often sufficient to impair the good quality of the optic connection offered by connector 10.

The clamping action of the spring 17, required for the correct union of the two front surfaces 15 and 15' can distort the two parts 13 and 13' of connector 10, modifying the possible correct alignment of optic fibers.

To try to minimize these disadvantages, alternative solutions have been proposed where said holes 14 are replaced by slides made on the connector sides.

However, also in this case, the associated backlash between pins and slides is such to impair the good quality of the optic connection offered by the connector.

In summary, the optic connection offered by connectors of this type is characterized by attenuation values always rather high (1 dB approx.) and by the poor repetition capability of the signal attenuation value during the different insertions.

U.S. Pat. No. 4,898,449 discloses a connector including two coupling elements in each of which end parts light conducting fibers are secured in such a manner that the centers of their end faces are situated on one line.

The connector further comprises a connector housing for receiving the two coupling elements. Each coupling element has a cylindrical outer surface and an orientation element which is capable of cooperating with an orientation member of the connector housing.

Said fibers are secured by means of a fiber holder heaving substantially the shape of a rectangular parallelepiped which is inserted into an internal cavity of the relevant coupling element.

According to such a device, a good coupling between each pair of light conducting fibers is performed if the fiber holder and the internal cavity are made with high precision.

OBJECT OF THE INVENTION

Object of this invention is therefore to supply a multifiber connector device for optic fiber cables allowing to obtain a good alignment of optic fibers to be connected.

An additional object of this invention is to supply a connecting device simple and stout, not showing the disadvantages of the above mentioned known technique.

Particular object of this invention is to supply a reliable connecting device, not requiring for its implementation, the use of expensive construction techniques.

DISCLOSURE OF THE INVENTION

These and other targets are reached through the invention consisting in an interconnection element for multifiber optic cables of the type including:

- a first and a second cylindrical ferrule, each having a longitudinal internal cavity where said fibers to be interconnected are abutted, a portion of the external face of each cylindrical ferrule forming a first flat surface;
- a sleeve consisting of a cylindrical body, hollow inside, able to receive said complementary cylindrical portions, the internal face of which including a second flat surface;
- orientation alignment means suitable to orient said fibers to be interconnected; characterised in that said first and second cylindrical ferrule have an opening so as to expose part of said internal cavity, and include:
- fibers vertical alignment means in form of a third flat surface in at least part which corresponds to said opening fibers lateral alignment means, in form of a fixing plate heaving longitudinal "V" shaped grooves, for the housing and lateral positioning on said third flat surface of said multifiber optical cable.

According to the invention, with a very simple construction, a ferrule can be made in which only the first flat surface and the flat surface of the internal cavity. i.e. the third flat surface have to be made with precision.

BRIEF DESCRIPTION OF THE DRAWINGS

The features of the present invention which are believed to be novel are set forth with particularity in the appended claims. The invention, together with further objects and advantages thereof, may be understood with reference to the following description, taken in conjunction with the accompanying drawings, and the several figures of which like referenced numerals identify like elements, and in which:

FIG. 3 shows the section of the two ferrule of FIG. 2 coupled through the above mentioned bush;

FIG. 4 shows the section of the connector made according to plan IV—IV of FIG. 2;

FIG. 5 shows the connector section made according to plan V—V of FIG. 2;

FIG. 6 shows the silicon plate 38 of FIG. 3 used for the positioning of fibers inside the connector;

FIG. 7 shows a section of one of the two ferrules of FIG. 1 made according to plan VII—VII of FIG. 4;

FIG. 8 shows a second embodiment of bush 23 of FIG. 2;

FIG. 9 shows the structures, plastic material made, destined to house the bush 23 and the two ferrules 21 and 22 of FIG. 2.

DETAILED DESCRIPTION OF THE PREFERRED EMBODIMENT

Figure 1:
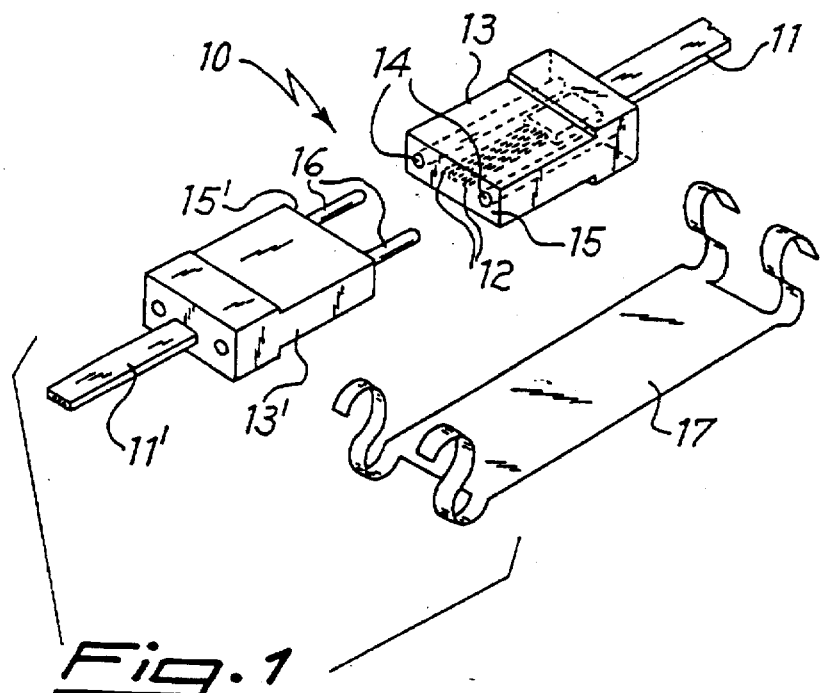
FIG. 1, already described, shows a perspective view, in partial section of a known multifiber connector.
Figure 2:
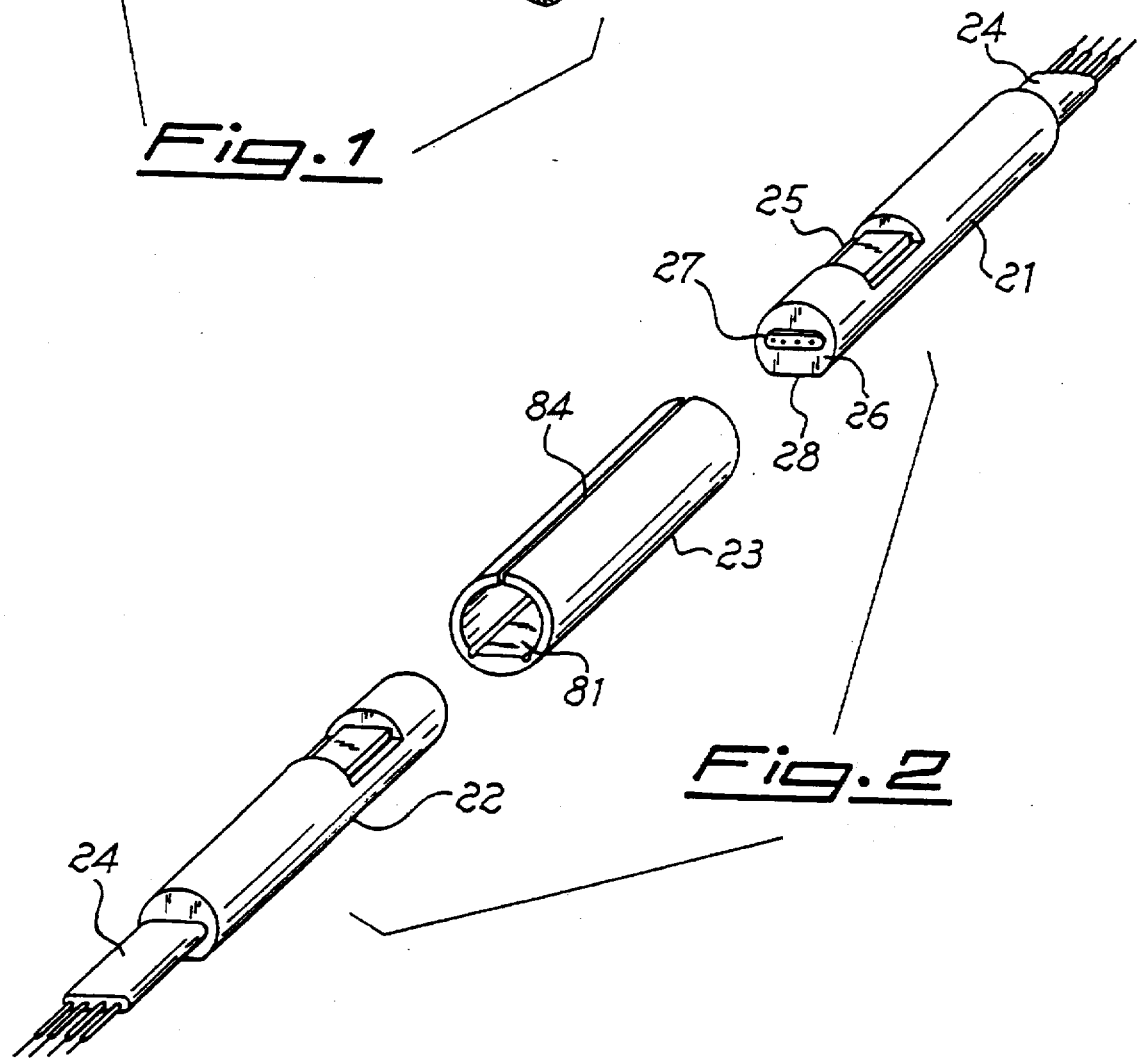
FIG. 2, shows a perspective view of two ferrule and one alignment bush of a multifiber connector according to the present invention.

Making reference to FIG. 2, two ferrules belonging to the two complementary elements of a connecting device according to the present invention are indicated 21 and 22, respectively.

An alignment bush for the two ferrules 21 and 22 was indicated with 23.

The ferrule 21 is ceramic material made, such as for instance alumina or zirconia and has cylindrical shape.

Referring to FIGS. 2 to 6 the structure of ferrule 21 will be shown. The complementary ferrule 22 shall not be described, being complementary to ferrule 21 as it can be clearly noticed from FIG. 3.

Ferrule 21 shows inside a longitudinal slide, crossing it from one end to the other one.

The longitudinal notch has rectangular shape with rounded edges and inside the same a 24 optic fiber tape is inserted.

In the particular embodiment shown, the tape 24 consists of four optic fibers.

Generally, this tape 24 can consist of a different number of fibers.

Close to the end to be coupled, the ferrule 21 shows on its side surface a flaring 25 having flat rectangular shape.

Usefully, flaring 25 is obtained through grinding of the lateral surface of ferrule 21.

Flaring 25 identifies an opening 36 (see FIG. 3) enabling access to said longitudinal notch starting from the lateral surface of ferrule 21.

Coinciding the opening 36, the longitudinal notch shows, on the side opposite to opening 36 itself, a 37 rectangular step, having size essentially similar to the size of opening 36.

The height of step 37 is equal to one half the height of notch 36, decreased by half thickness of a fiber without external protection (typically 25 micron).

Matching step 37, optic fibers of tape 24 are cleared from the external protection. Their diameter assumes then 125 micron value.

Fibers of tape 24, made free from the external protection, rest on step 37. Due to the thickness of step 37, fibers assume a position such that the longitudinal axis of each fiber lays on the mean longitudinal plan of the longitudinal notch.

A plate 38 for fiber fixing (see also FIG. 6) in placed above step 37. On one side of plate 38, four 'V' shaped grooves 61 are obtained suitable to receive said fibers.

This step creates in fact a flat surface, resulting parallel to the plan surface consisting of said notch 28.

In particular, considering that on said step, fibers rest and their alignment in respect with the fibers of the complementary connector mainly depends on the accuracy employed to determine their distance versus the reference plan consisting of said notch 28, the step is realized with tolerance lower than µm.

FIG. 6 shows in detail the arrangement of the four grooves 61, without fibers housed.

Preferably the plate 38 is made of silicon.

Plate 38 is rested on the step 37 with the grooved 61 side downward.

The silicon plate 38 is joined to the step 37 with bonding agents or resins.

The above mentioned longitudinal notch is partly filled with fixing material 39, one optic fibers of the tape 24 and plate 38 are inserted.

The fixing material 39 is preferably argentana. This material is characterized by a lower hardness compared to the material of optic fibers.

Particularly referring to FIGS. 2 and 3 the end 26 of ferrule 21 shows a contact front part 27, consisting of the front edge of ferrule 21 itself, of the longitudinal notch filled with the fixing material 39 and of contact sides of optic fibers.

In the embodiment shown in FIG. 3 this end 27 has flat shape and shows a slight slope (8° approximately) from top to bottom.

In the embodiment shown in FIG. 7 this end 27 has rounded shape.

The shape of end 27 is made in the working phase of ferrule 21 through a lapping and polishing operation involving the ferrule edge, the fixing material and fibers at the same time and consequently the front side of the ferrule shall result rounded both in respect with the horizontal axis and versus the vertical one.

Referring to FIGS. 2 and 8 the structure of the alignment bush 23 will be shown.

Bush 23 is phosphorous made of bronze or zirconia and has cylindrical shape, according to a preferred embodiment.

The internal surface of bush 23 shows a longitudinal reference guide 81 preferably crossing the bush 23 along the whole length.

The longitudinal guide 81 has rectangular flat shape and has width corresponding to the notch 28 width, preferably consisting of said flat surface of ferrule 21.

On the internal surface of the bush 23, at the edges of guide 81, two longitudinal channels 82 and 83 are obtained, having the function to neatly separate the circular surface of said flat surface of notch 81.

Bush 23 shows a slot 84 giving elasticity to the bush itself.

In the embodiment shown in FIG. 2 the slot 84 is longitudinal while in the embodiment shown in FIG. 8 it is an helical slot.

The two complementary ferrules 21 and 22 are inserted one in front of the other in the two opposite openings of bush 23 in order that the longitudinal guide 81 of bush 23 slides in notch 28 of each one of ferrules 21 and 22.

It is evident that resting the flat surface 28 on the flat surface 81, fibers shall result perfectly aligned is the above mentioned step 37 is made with due accuracy, Referring to FIG. 9 covering and support elements for ferrules 21 and 22 and for bush 23 shall be described.

Covering and support elements described hereafter are essentially of the known type.

The cylindrical bush 23 is placed inside two sleeves 91 and 92.

These sleeves are fit with a longitudinal hole 93 destined to house the bush 23 and, after insertion of the same, sleeves 91 and 93 are joined together, for instance through gluing.

Ferrules 21 and 22 are on the contrary partially inserted in a same number of handles 94 and 95 from which fiber tapes 24 come out.

The advantages of the invention are evident.

Due to the "V" grooves fibers are arranged with high accuracy on plate 38. The Plate 38 is fixed in its turn with high accuracy, to a flat surface parallel to said notch 28, inside the longitudinal notch of ferrules 21 and 22.

The longitudinal guide 81 of bush 23 assures, engaging against notch 28 of ferrules 21 and 22, a correct alignment of the same and consequently, a correct alignment of optic fibers belonging to tapes 24.

Alignment between ferrules 21 and 22 assured by flat surfaces foreseen on ferrules 21 and 22 and on bush 23 results to be more accurate compared to the alignment given by any other coupling system based on pins or guides. In fact, from an implementation point of view, it results easier to realize the flat surface of notch 28 and of guide 81 of the bush, than an alignment system realized with cylindrical elements such as pins and guides.

Typical attenuation values offered by connectors according to the present invention are of 0.3 dB approximately, much better than typical attenuation values offered by said known connectors.

The optical connection offered by the connector according to the invention is characterized by the good repetition capability of the signal attenuation value during the different insertions.

Where required, it is possible to furtherly increase the accuracy of the connector, increasing the number of notches 28 present on ferrules 21 and 22 and, similarly, obtaining an equal number of longitudinal guides 81 on the internal surface of bush 23.

In this case, the embodiment of the bush shown in FIG. 8 results advantageous compared to the embodiment of the bush in FIG. 2, since it makes easier the realization of a second guide element 81. Also, this embodiment of bush 23 imposes an evenly distributed stress on the whole lateral surface of ferrules 21 and 22, contributing to diminish the risk of breaks and distortions.

The fact that the fixing material 39 (argentana) for fibers is softer that the material of optic fibers, offers number of advantages.

When the ends 27 of the two ferrules 21 and 22 come in contact, the fixing material 39 distorts until the fibers of the two ferrules 21 and 22 touch each other, In FIG. 3 the front side of the two ferrules, has been shown for graphic requirements before these units are submitted to lapping. However, it is evident for a technician of the field that after this operation is made fibers shall result directly in contact or the fixing material first, then fibers, due to the distortion of this material.

This distortion determines an "fitting effect" of the ends eliminating the presence of air gaps due to errors in the lapping process.

It must be highly appreciated the fact that both ferrules 21 and 22 and the bush 23 have cylindrical shape, which enables to employ the same covering elements (91, 92, 94, 95) and support elements used for single fiber connectors, without the need-of any modification.

While a particular embodiment of the present invention has been shown and described, it should be understood that the present invention is not limited thereto since other embodiments may be made by those skilled in the art without departing from the scope thereof. It is thus contemplated that the present invention encompasses any and all such embodiments covered by the following claims.

We claim:

1. Interconnection element for multifiber optic cables comprising:

a first and a second cylindrical ferrule, each having a longitudinal internal cavity in which said fibers to be interconnected are abutted, a portion of the external face of each cylindrical ferrule forming a first flat surface;

a sleeve consisting of a cylindrical body, hollow inside, able to receive said complementary cylindrical portions, the internal face of which has a second flat surface; and orientation alignment means suitable to orient said fibers to be interconnected;

wherein said first and second cylindrical ferrules have an opening so as to expose part of said internal cavity, and include;

fibers vertical alignment means in the form of a third flat surface in at least a part which corresponds to said opening, and fibers lateral alignment means, in the form of a fixing plate having longitudinal "V" shaped grooves, for the housing and lateral positioning on said third flat surface of said multifiber optical cable.

2. The element according to claim 1, wherein said fixing plate is made of semiconductor material.

3. The element according to claim 1, wherein said third flat surface is parallel to said first flat surface.

4. The element according to claim 1, wherein each one of said hollow cylindrical portions are filled, coinciding to the front contact part of said optic fibers with fixing material softer than the material optic fibers are made.

5. The element according to claim 1, wherein the lateral surface of said sleeve has a longitudinal slot.

6. The element according to claim 5, wherein said longitudinal slot is a straight shaped slot.

7. The element according to claim 5, wherein said longitudinal slot is a helical shaped slot.

8. The element according to claim 1, wherein said sleeve is made of phosphorous bronze.

9. The element according to claim 1, wherein said sleeve is made of zirconia.

10. The element according to claim 4, wherein said fixing material is argentana.

11. The element according to claim 1, wherein front contact parts of said complementary cylindrical portions are smaller than cross sizes of said complementary portions.

12. The element according to claim 1, wherein said front contact parts of said complementary cylindrical portions are flat and slightly sloped.

13. The element according to claim 12, wherein said slight slope is 8° slope.

14. The element according to claim 1, wherein front contact parts of said complementary cylindrical portions are rounded.

15. The element according to claim 1, wherein said opening and said third flat surface in said first and second cylindrical ferrules are obtained by grinding the lateral surface of the same complementary cylindrical ferrules.

* * * * *